United States Patent

[11] 3,600,106

[72] Inventors Stephen S. Baits;
Kenneth I. Brenner, both of Rockford, Ill.
[21] Appl. No. 849,830
[22] Filed Aug. 13, 1969
[45] Patented Aug. 17, 1971
[73] Assignee Sundstrand Corporation

[54] SELF-PRESSURIZING SCHEME
19 Claims, 4 Drawing Figs.
[52] U.S. Cl. ..................................... 417/190, 74/687
[51] Int. Cl. ..................................... F04f 5/48, F16h 47/04
[50] Field of Search ........................ 417/191, 190, 189, 182; 137/154; 74/687

[56] References Cited
UNITED STATES PATENTS
2,399,670  5/1946  Freygang ............... 417/190 X
2,705,457  4/1955  Le Van .................. 417/191 X Primary Examiner—Leonard H. Gerin
Attorney—Hofgren, Wegner, Allen, Stellman & McCord ABSTRACT: A case pressurization system for aircraft constant speed drives and certain other aircraft components employing housings with sumps including a venturi injector within the housing supplied fluid under pressure from a suitable source with a differential pressure valve for selectively supplying atmospheric air to the venturi injector when sump pressure falls to a predetermined value relative to atmospheric pressure with the injector directing air entrained fluid into the sump providing adequate inlet pressure for a scavenge pump withdrawing fluid from the sump.

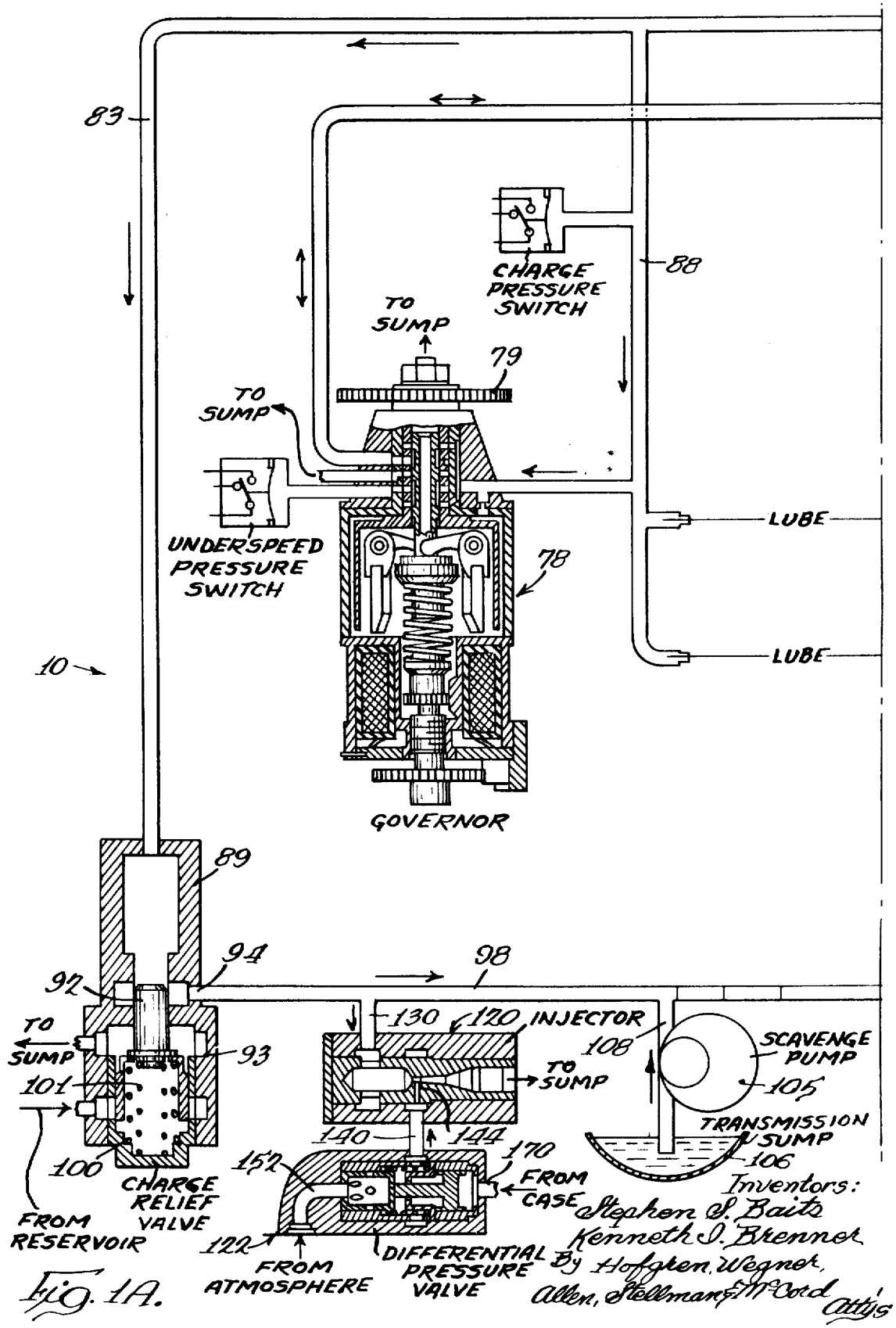

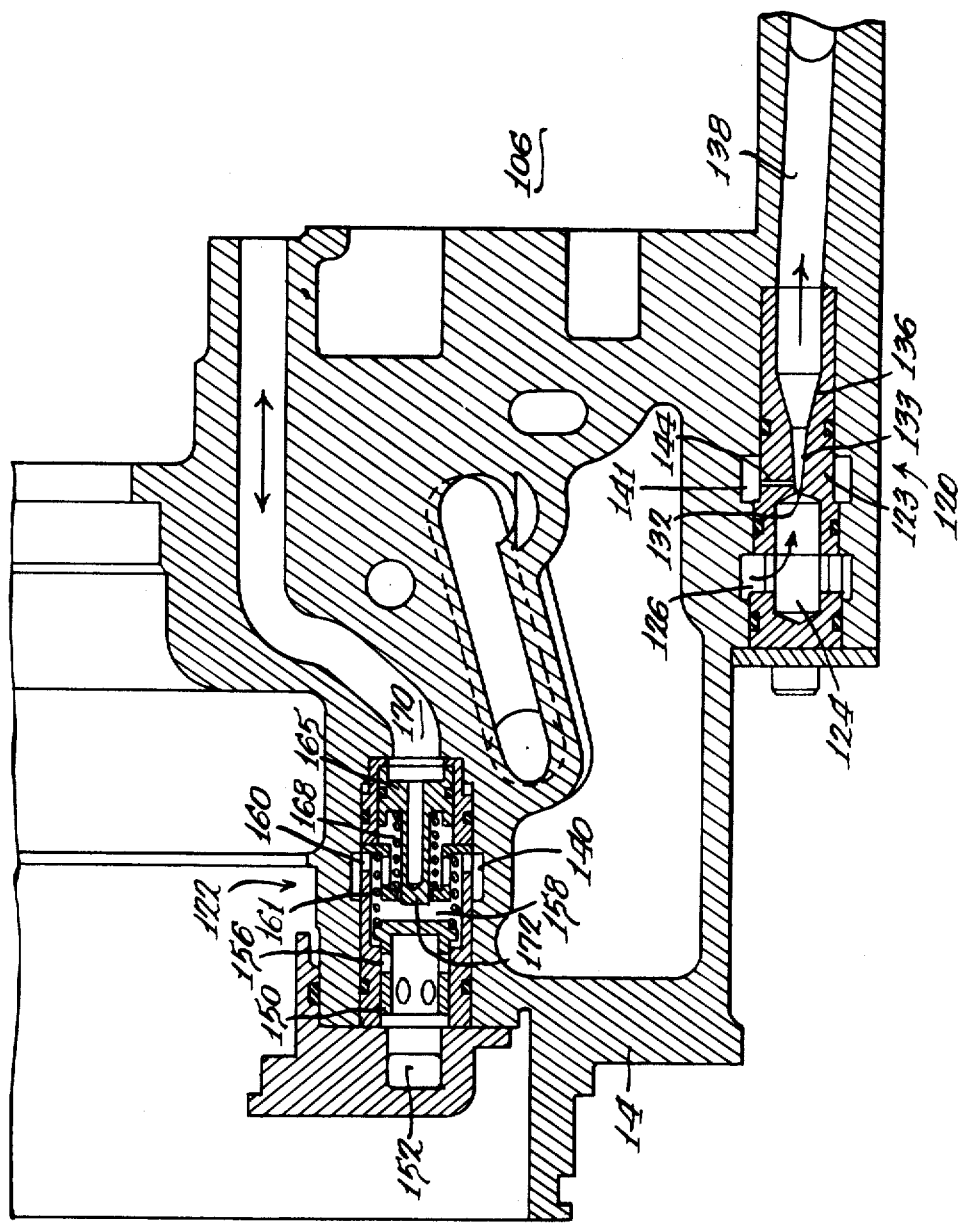

SELF-PRESSURIZING SCHEME

BACKGROUND OF THE PRESENT INVENTION

Aircraft constant speed drives and certain other drive assemblies and generator components frequently have fluid sumps from which fluid is withdrawn for the purpose of supplying fluid to drive components for lubrication and control purposes.

In constant speed drives it has been conventional in the past to deliver bleed air from one of the aircraft engines into the constant speed drive housing sump to maintain an adequate inlet pressure for the scavenge pump in the drive housing which withdraws fluid from the sump. To accomplish this, it has been necessary to provide not only conduits external to the drive housing itself, but also a plurality of valves in these conduits to properly regulate the flow of air into the drive sump from the engine. In one instance, this conventional hardware weighs 5 lbs. which is a significant structural weight in an aircraft, particularly where an exemplary drive for a 60 KVA output would not be significantly more than 80 lbs. Thus the elimination of this prior hardware for conveying and regulating bleed air from the engine to the constant speed drive could reduce the overall installed weight by more than 5 percent if such were possible.

It is a primary object of the present invention to reduce the required component weight in aircraft systems by providing a sump pressurization scheme which eliminates the need for engine bleed hardware external to the component itself.

SUMMARY OF THE PRESENT INVENTION

In accordance with the present invention, a venturi injector is provided within the constant speed drive housing itself for the purpose of supplying air entrained liquid into the transmission sump for the purpose of providing a sufficient inlet head for the scavenge pump to maintain scavenge pump efficiency at the desired level. Toward this end, the injector is supplied drain fluid from a charge pump relief valve. The injector is supplied with atmospheric air through a differential pressure valve also within the drive housing. The injector operates through a venturi principle to aspirate air and entrain it in the charge pump fluid being directed from the injector directly into the transmission sump.

The differential pressure valve permits air to flow to the injector when ambient pressure exceeds case pressure by a predetermined differential. When the case pressure is greater than atmospheric pressure by a predetermined value, the differential pressure valve will close blocking the flow of air to the injector.

Moreover, the differential pressure valve is constructed so that it will remain closed when the drive is not operating preventing the leakage of oil that backs up into the injector from the drive casing.

DESCRIPTION OF THE DRAWINGS

FIGS. 1A, 1B and 1C are schematic illustrations of a constant speed drive with the present case pressurization scheme; and FIG. 2 is a fragmentary section of a constant speed drive illustrating the injector and differential pressure valve.

DETAILED DESCRIPTION OF THE PREFERRED EMBODIMENT

Figure 1B:
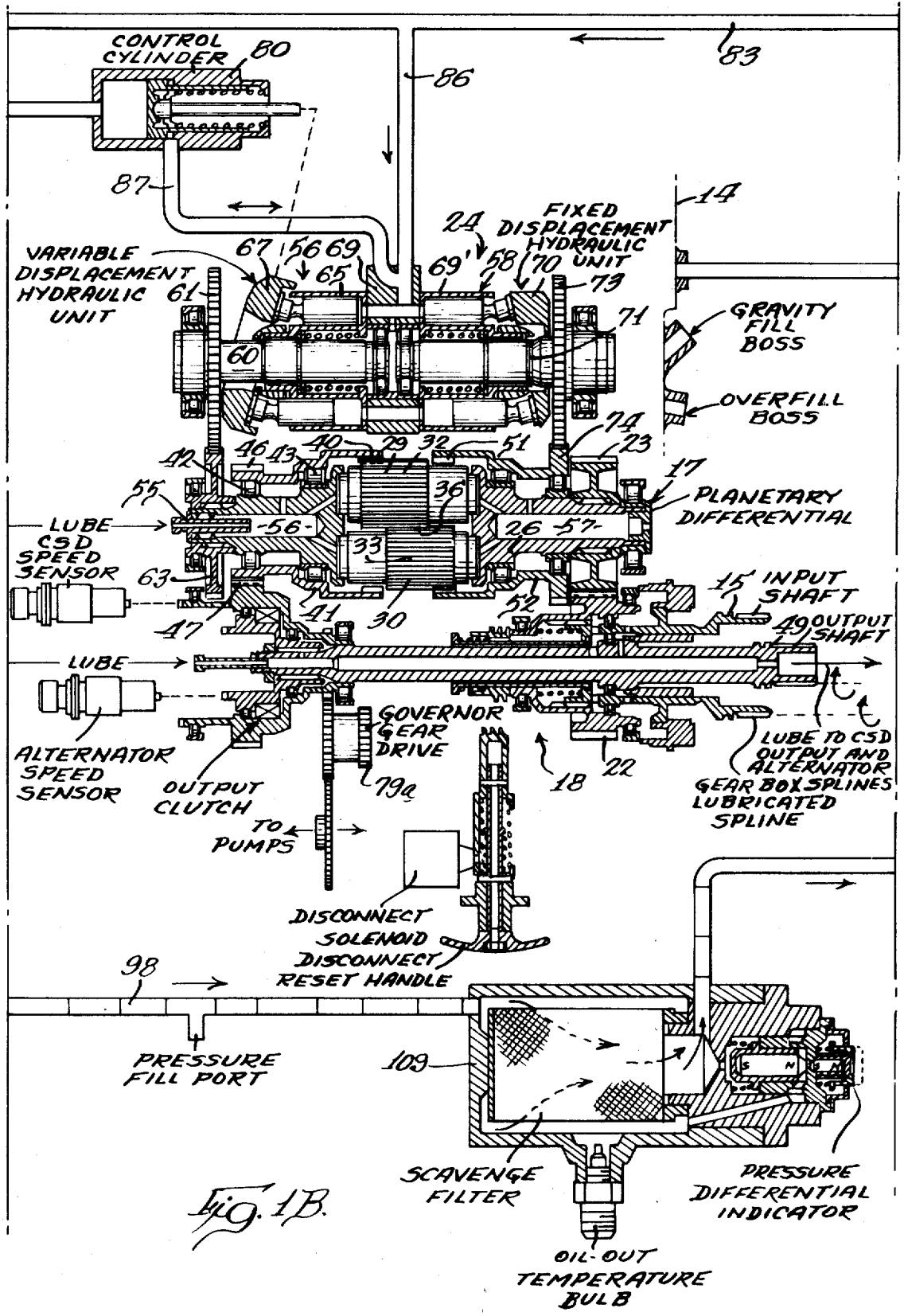
Figure 1C:
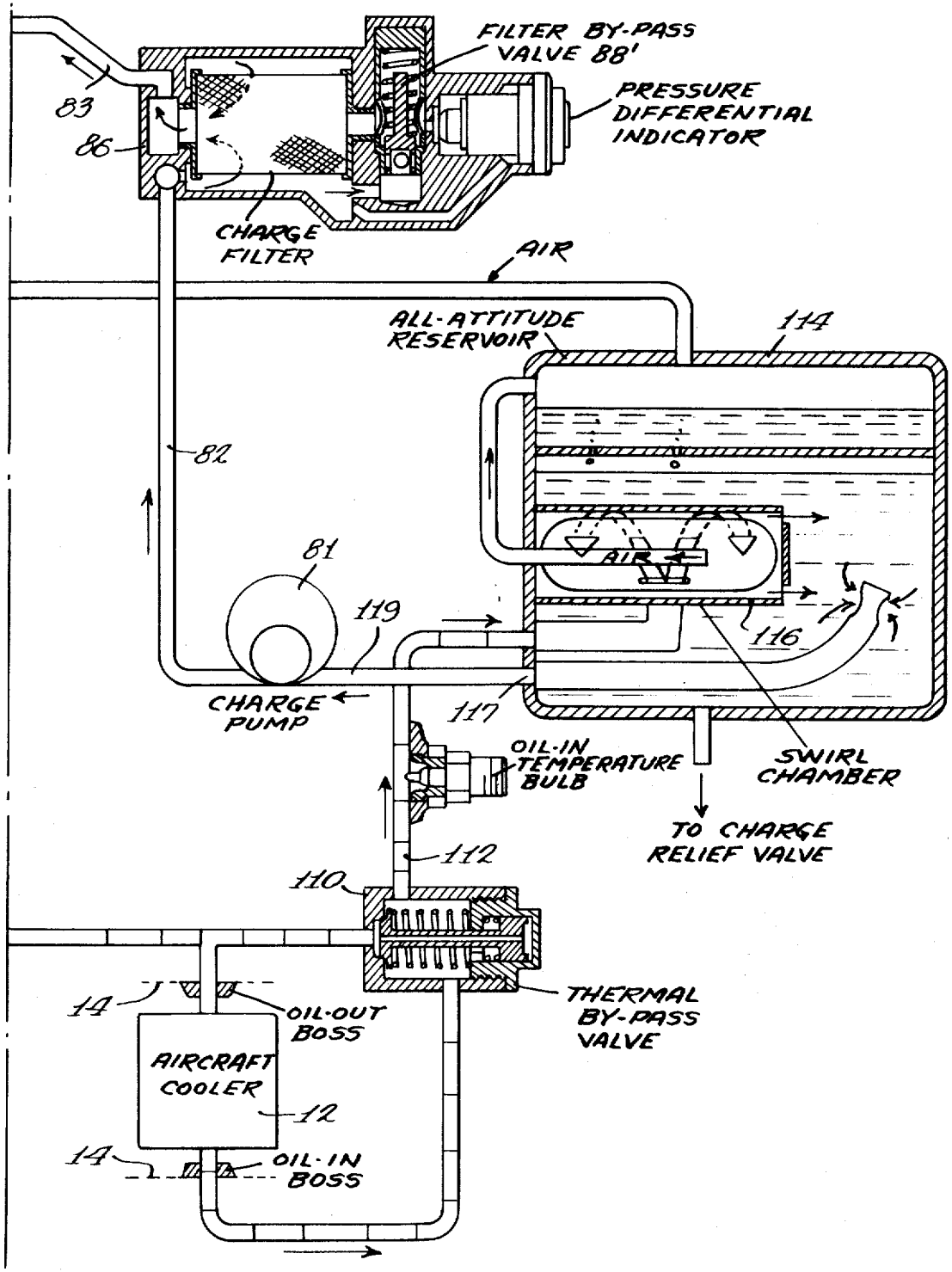

As seen in FIGS. 1A, 1B and 1C, a constant speed drive assembly 10 is shown in generally schematic form with the components individually separated by conduits. It should be understood that all of these components with the exception of aircraft cooler 12 (FIG. 1C) are within a single generally cylindrical constant speed drive housing indicated schematically at 14 (FIG. 1B) and resembling the housing in U.S. Pat. No. 3,365,981 which shows a constant speed drive of the type under consideration here.

As is well known, the constant speed drive 10 is adapted to be mounted adjacent the aircraft engine or gear box pad. A splined input shaft 15 (FIG. 1B) is mounted in the housing and extends outwardly therefrom so that it may be inserted into a hollow splined output shaft in the associated gear box (not shown).

The input shaft 15 drives planetary gearing 17 through a quick disconnect coupling 18 described in more detail in U.S. Pat. No. 3,365,981.

Input shaft 15 drives differential 17 through gear 22 and gear 23, the latter being rotatably fixed to a differential carrier 26. The gear differential 17, along with hydraulic drive 24 which controls the differential, serves to control the output speed of the transmission relative to the input speed of shaft 15 to maintain a constant output speed.

Rotatable in an intermediate portion of the gear carrier 26 are elongated pinion planets 29 and 30. The pinions 29 and 30 have teeth 32 and 33, respectively, interengaging at 36 so that they rotate about their own axes at equal speeds in opposite directions. The teeth 32 on pinion 29 engage teeth on an output ring gear 40 formed in an elongated stepped sleeve 41 mounted by bearings 42 and 43 on the carrier 26. The sleeve 41 has a spur gear 46 formed integrally therewith which drives an output gear 47 concentrically disposed with respect to and drivingly connected with an output shaft 49 rotatably mounted within the input shaft 15.

Gear teeth 33 on pinion 30 engage a control ring gear 51 formed integrally with a stepped cylindrical control sleeve 52 rotatably mounted by bearings on the carrier 26. Lubrication is provided for the gear differential 17 through a lubricating tube 55 and lubrication passages 56 and 57 within the carrier 26.

It may be readily seen that if the ring gear 51 rotates in an opposite direction to the carrier shaft 26, this will increase the speed of rotation of the pinions 29 and 30 about their own axes and thereby increase the speed of rotation of the output ring gear 40 above the ratio which would exist if the ring gear 51 were held stationary. On the other hand, if the ring gear 51 is rotated in the same direction as the carrier shaft 26, the pinions 29 and 30 will rotate at a slower speed than if the ring gear 51 were held stationary and thereby reduce the output speed. When the ring gear 51 is held stationary, the differential is in a so-called straight-through drive condition. In the above manner, the control gear 51 serves to add or subtract speed from the differential.

For the purpose of controlling the speed and direction of the control ring gear 51, the hydraulic drive 24 is provided consisting of two back-to-back hydraulic units 56 and 58 mounted in parallel relation with the gear differential 17. Each of the hydraulic units may act as either a pump or a motor depending upon the displacement control described in more detail below. The hydraulic unit 56 is of the variable displacement type and has a shaft 60 with the gear 61 formed integrally thereon which engages the spur gear 63 that rotates with the input shaft 15. The shaft 60 is splined to and is driven by or drives a rotating cylinder block 65 carrying reciprocable axial pistons. An adjustable swashplate or cam member 67 reciprocates the pistons in the cylinder block to deliver hydraulic fluid from the variable hydraulic unit 56 when it is acting as a pump. The cylinder block 65 slidably engages a valve plate 69 having two arcuate ports therethrough adapted to connect the units 56 and 58 in closed hydraulic circuit.

The fixed displacement hydraulic unit 58 consists of a rotating cylinder block 69' having reciprocable pistons therein driven by a stationary swashplate member 70. Similar to the block 65 the block 69' slidably engages the valve plate and the pistons therein deliver and receive fluid through the arcuate ports in the valve plate 69. A drive shaft 71 is splined to and rotates with the cylinder block 69' and carries a spur gear 73 on the outboard end thereof which engages the spur gear 74 on the control ring gear sleeve 52. The inner adjacent ends of the shafts 60 and 71 are supported in bearings in the valve plate 69.

With the swashplate in the position shown and with the gear 61 rotating in a clockwise direction when viewed from the input shaft side of the transmission, the variable hydraulic unit 56 will act as a pump being driven from the input shaft 15 delivering high pressure fluid through the valve plate 69 and forcing the pistons down the inclined surface of the fixed cam 70 thereby rotating shaft 71 and the control gear 51 in a direction to add speed to the differential 17. Conversely, when the swashplate 67 is reversed from the position shown, the hydraulic unit 58 acts as a pump being driven by the control ring gear 51 which then rotates in the opposite direction as it is driven by pinion 74 to deliver high pressure fluid to the variable hydraulic unit 56 which then acts as a motor or a metering unit retarding the free flow of high pressure fluid from the hydraulic unit 58 to the hydraulic unit 56 thereby constraining rotation of the ring gear 51 which is then rotating in a direction to subtract speed from the differential output.

The drive is controlled by a governor 78 (FIG. 1A) which is driven by a gear 79 drivingly connected to the output shaft 49 by a suitable connection as at 79A in FIG. 1B. The governor 78 selectively supplies fluid under pressure to a control cylinder 80 for the purpose of varying the displacement of hydraulic unit 56 to maintain constant the speed of output shaft 49.

A charge pump 81 (FIG. 1C) is provided for delivering makeup, lubricating and control fluid for the system through conduits 82 and 83. Fluid flowing through conduit 82 passes through a filter 86, through a filter element therein and then into conduit 83. If the filter element becomes excessively clogged, unduly restricting flow therethrough, a filter bypass valve 88' permits fluid flowing from conduit 82 to bypass the filter element and pass directly into line 83. The charge or makeup fluid in conduit 83 is fed through the low pressure passage or port in the valve plate 69 through conduit 86 (FIG. 1B) to make up for loss of fluid caused by leakage from these units. Charge pressure is delivered through conduit 87 to bias the control cylinder 80 and through conduit 88 (FIG. 1A) to the control governor 78. Excess charge fluid flows over a charge relief valve 89.

The purpose of the charge relief valve 89 is to maintain a preset charge pressure in the conduit 83. The preset pressure may be on the order of 300 lbs. per square inch. This valve consists of a spool 92 slidably mounted in the stationary valve member 93 having a discharge port 94 therein communicating with a return conduit 98. The spool 92 is biased upwardly by springs 100 and 101. The force of the springs is selected so that when just over 300 p.s.i. pressure is exerted on the upper end of spool 92 it will move downwardly opening port 94 to the conduit 98 permitting the charge fluid to flow into the conduit 98.

A scavenge pump 105 (FIG. 1A) is provided for drawing leakage oil from a drive sump 106 formed within the drive housing 14 and delivering it to the return conduit 98 through conduit 108.

Scavenge fluid in line 98 from pump 105 passes through a scavenge filter 109 (FIG. 1B) and from there is normally passes outside of the housing 14 through the aircraft cooler 12 (FIG. 1C). A thermal bypass valve 110 is provided for bypassing cooler 12 in the event of a thermal breakdown therein. Fluid from cooler 12 or bypass valve 110 passes through passage 112 into an all-attitude reservoir 114. The all-attitude reservoir 114 includes a swirl chamber 116 where the entrained air is separated from the fluid and air-free fluid passes from the chamber through a peripheral port 117. Fluid from port 117 is delivered to the inlet of charge pump 81 through conduit 119.

As described above, it is desirable to maintain a sufficient pressure within the transmission or drive sump 106 so that there is sufficient pressure head at the inlet of scavenge pump 105 to achieve efficient scavenging. Toward this end an injector or ejector 120 is provided which in conjunction with charge pump 81 and a differential pressure valve 122 delivers air entrained fluid into the sump 106 maintaining the sump at a predetermined pressure with respect to atmospheric pressure. Injector 120 and differential pressure valve 122 are shown located in their respective positions in the drive housing 14 more clearly in FIG. 2 and reference should be made to both drawings for the following description of these components and their operation.

Injector 120 includes a cylindrical sleeve 123 having an enlarged central receiver 124 communicating through an annular passage 126 in the housing with return passage 98 through conduit 130. Inlet receiver 124 supplies returning charge fluid through an orifice 132 and a venturi section 133. The venturi section communicates with a conical diffuser section 136 where pressure recovery takes place converting the high velocity fluid flow from section 133 into a high pressure oil-air mixture which is delivered into the transmission sump 106 through passage 138 (FIG. 2) in the housing.

The differential pressure valve 122 serves to selectively deliver air to the injector 120 through a conduit 140 (FIG. 1) which communicates with an annular passage 141 in the housing 14 surrounding the cylindrical injector member 123. Air is delivered to a low pressure point adjacent the injector nozzle by a passage 144.

Thus the present pressurization system makes use of a jet pump principle. The injector 120 operates by entraining air into the oil from inlet 124 by injecting outside air to the low pressure point of the nozzle defined by orifice 132 and section 133 and jetting the oil at a high velocity into the diffuser section 136. The resulting mixture compresses in the diffuser and is discharged to the sump at a higher pressure.

The entrainment of air and mixing results from (a) acceleration of the air particles by impact with the oil (b) entrainment of the air by viscous friction at the periphery of the oil jet from orifice 132 and/or (c) expansion of the oil to a pressure below that of the air.

The differential pressure valve 122 controls the level of pressure in the transmission sump 106 and acts as a check valve as well to prevent oil leakage when the transmission is not in operation.

Toward this end the valve 122 is provided with a reciprocable vacuum break piston 150 having a hollow interior freely communicating with atmosphere through passage 152. Piston 150 has ports 156 which selectively communicate with interior 158 of the valve when the piston is moved sufficiently to the right from the position shown in FIGS. 1A and 2. Interior 158 communicates through ports 160 with the passage 140 leading to the injector 120 and in this manner air is delivered selectively to the injector.

The piston 150 is biased to its left air-blocking position by spring 161. The force provided by spring 161 is a relatively low force for the purpose of keeping the piston closed when the injector 120 is not operating, thereby preventing the leadage of oil that backs up into the injector 120.

For the purpose of sensing pressure in the sump, the valve 122 includes a case pressure piston 165 biased to the right by spring 168. The right end of piston 165 communicates with sump and senses pressure therein through passage 170 in the housing 14. Piston 165 has a pilot projection 172 adapted to engage and shift piston 150 to the left closing ports 156 upon sufficient pressure in the case line 170.

Thus, the differential pressure valve 122 operates through the application of atmospheric pressure upon the left side of the valve assembly acting on piston 150 and case pressure acting on the right side of the valve assembly on piston 165. Springs 161 and 168 as well as the piston areas are selected so that the piston 150 will shift sufficiently to the right to port air to the injector 120 when external air ambient pressure is 0.4 p.s.i., for example, greater than the pressure in the sump 106. Air is thus then delivered through passage 140 to the injector 120 so that the injector increases pressure within the transmission sump 106.

As pressure in the sump or case increases, the case pressure piston 165 moves to the left against the vacuum break piston 150. When the pressure in the case or sump is approximately 5.5 p.s.i., for example, greater than ambient pressure, the vacuum break system 150 will be completely closed blocking ports 156 and thereby preventing air flow to the injector.

While the injector 120 has been shown and described as supplied from the charge pump downstream from the charge relief valve, it should be understood that it could be supplied directly form the charge pump, or from some other pump such as a lubricating pump.

We claim:

1. A pressurization system for an aircraft drive, comprising: drive housing means, rotary mechanism in the housing means, a fluid sump disposed in said housing means, pump means associated with said housing means and rotating with said rotary mechanism for withdrawing fluid from said sump, and means for pressurizing said sump including second pump means in said housing means rotating with said rotary mechanism for supplying fluid to said sump.

2. A pressurization system for an aircraft drive, as defined in claim 1, wherein said second pump means includes an injector in said housing means, means for supplying liquid fluid under pressure to said injector, and means for supplying air to said injector in a manner to be entrained by said liquid fluid, said injector supplying air entrained liquid to said sump to increase the pressure therein.

3. A pressurization system for an aircraft drive, as defined in claim 2, including means for selectively delivering air to said injector responsive to pressure in said sump.

4. A pressurization system for an aircraft drive, as defined in claim 2, including means for selectively delivering air to said injector responsive to the pressure differential between said sump means and atmosphere.

5. A self-pressurized constant speed drive, comprising: housing means, an input shaft in the housing means, an output shaft in the housing means adapted to be driven at a constant speed, drive means in said housing means connecting the input and output shafts for maintaining a substantially constant output shaft speed, fluid operable control means for said drive means, a sump in said housing means, pump means in said housing means for withdrawing fluid from the sump and supplying fluid under pressure to said control means, and means for pressurizing said sump including an injector connected to utilize fluid from said pump means.

6. A self-pressurized constant speed drive, as defined in claim 5, and means for supplying air to said injector in a manner to be entrained in fluid from said charge pump.

7. A self-pressurized constant speed drive, as defined in claim 6, including a differential pressure valve for supplying air to said injector.

8. A self-pressurized constant speed drive as defined in claim 7, wherein said differential pressure valve is responsive to the pressure differential between atmosphere and said sump, said valve being constructed to supply air to said injector when the atmospheric pressure increases to a predetermined value with respect to the pressure in said sump.

9. A self-pressurized constant speed drive as defined in claim 8, wherein said differential pressure valve includes an atmospheric pressure responsive piston and a separate sump pressure responsive piston, means continuously biasing said atmospheric pressure responsive piston to a position blocking air flow to said injector so that fluid may not leak to atmosphere.

10. A self-pressurized constant speed drive as defined in claim 9, wherein said sump pressure responsive piston urges said atmospheric pressure responsive piston in a direction blocking air flow to said injector in response to increasing sump means pressure.

11. An ejector assembly for pressurizing an aircraft component having a housing with a sump therein, comprising: an ejector, means for supplying liquid under pressure to said ejector, said means for supplying air to said ejector including a differential pressure valve, said valve having a first piston responsive to atmospheric pressure and movable to an open position supplying air to said ejector, a second piston responsive to sump pressure and operable on increasing pressure to engage and move said first piston in a direction closing air flow to said ejector.

12. An ejector assembly as defined in claim 11 including means continuously biasing said first piston to a closed position.

13. A self-pressurized constant speed drive, comprising: a housing, an input shaft in said housing, an output shaft extending from said housing, differential gearing interconnecting said input shaft and said output shaft, hydraulic drive means connected to said differential gearing to maintain a substantially constant output shaft speed, fluid operable control means for said hydraulic drive, a sump in said housing, a scavenge pump for withdrawing fluid from said sump, a charge pump for supplying fluid to said control means, said charge pump being connected to receive fluid from said scavenge pump, a charge pressure relief valve in the outlet of the charge pump, and means for pressurizing the sump including an ejector downstream from said charge pressure relief valve and connected to receive charge fluid passing over said relief valve, and means for controlling the supply of air to said ejector in a manner to be entrained by charge fluid passing through the ejector including a differential pressure valve, said differential pressure valve being responsive to the pressure differential between the sump and atmosphere and being constructed to supply air to said ejector when sump pressure decreases to a predetermined value with respect to atmospheric pressure.

14. A self-pressurized constant speed drive, comprising: housing means, an input shaft in the housing means, an output shaft in the housing means, drive means in the housing means connecting the input shaft and the output shaft for driving the latter at a substantially constant speed, fluid operable means for controlling said drive means, a sump in said housing means, a charge pump in said housing means for supplying fluid under pressure to said control means, a pump for withdrawing fluid from said sump, and means utilizing fluid from said charge pump for pressurizing said sump.

15. An aircraft drive, comprising: housing means, an input shaft mounted in the housing means, an output shaft mounted in the housing means, drive means in the housing means for rotating the output shaft responsive to rotation of the input shaft, a sump in said housing means, pump means in said housing means for withdrawing fluid from said sump and supplying fluid under pressure for lubricating said drive means, and means utilizing fluid from said pump means for pressurizing said sump.

16. An aircraft drive as defined in claim 15, said pump means including a charge pump driven by the output shaft for supplying lubricating fluid to said drive means, and a scavenge pump driven by said output shaft for withdrawing fluid from said sump and supplying fluid to said charge pump.

17. An aircraft drive as defined in claim 16 including an injector utilizing fluid from said charge pump, and means for supplying air to said injector for pressurizing said sump.

18. An aircraft drive as defined in claim 17, wherein said means for supplying air includes a valve constructed to open and admit air when atmospheric pressure is greater than sump pressure by a predetermined amount.

19. An aircraft drive as defined in claim 18, wherein said valve includes a first piston responsive to atmospheric pressure and movable to an open position supplying air to said ejector, a second piston responsive to sump pressure and operable on increasing pressure to engage and move said first piston in a direction closing air flow to said ejector.